Patented Jan. 17, 1950

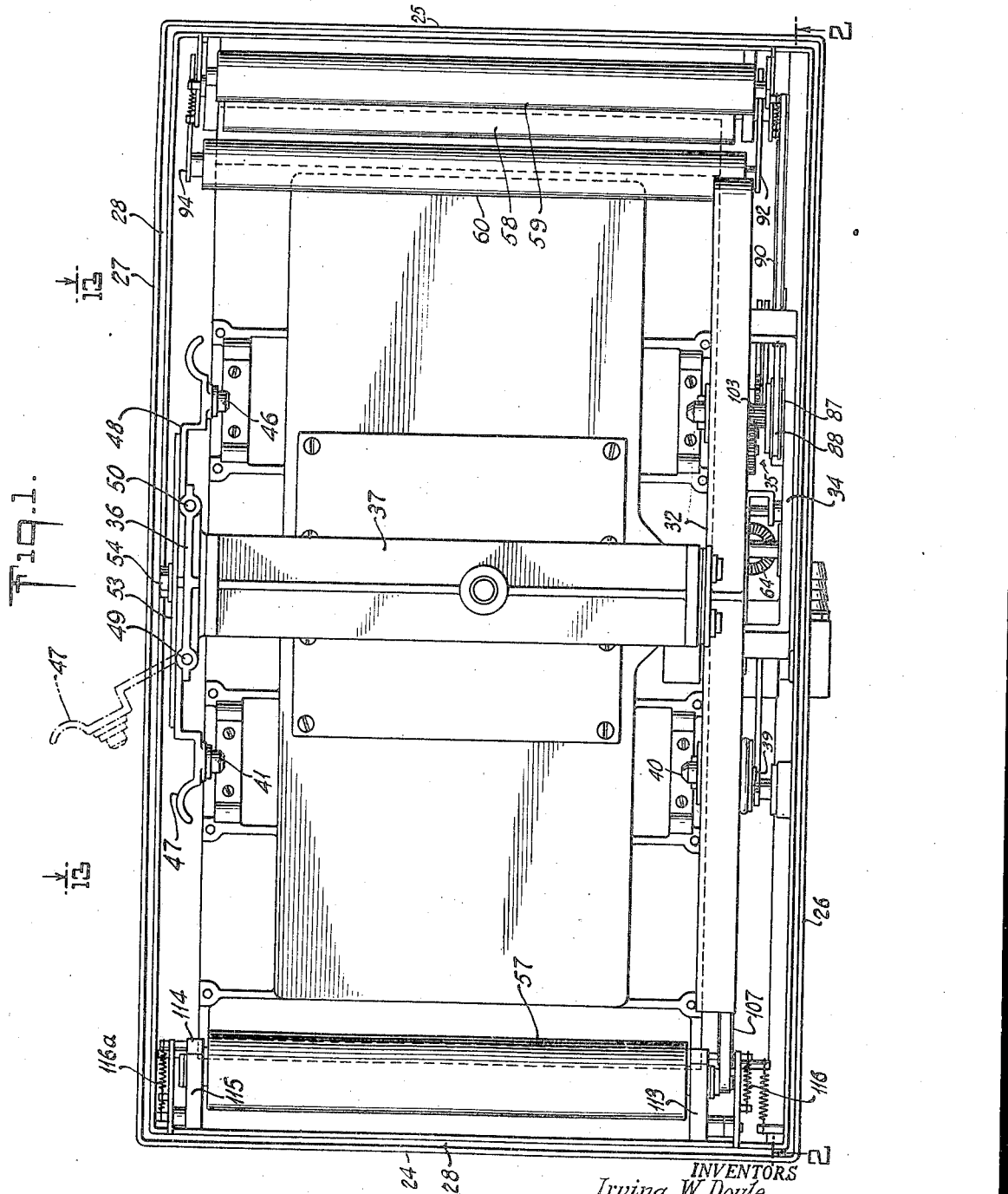

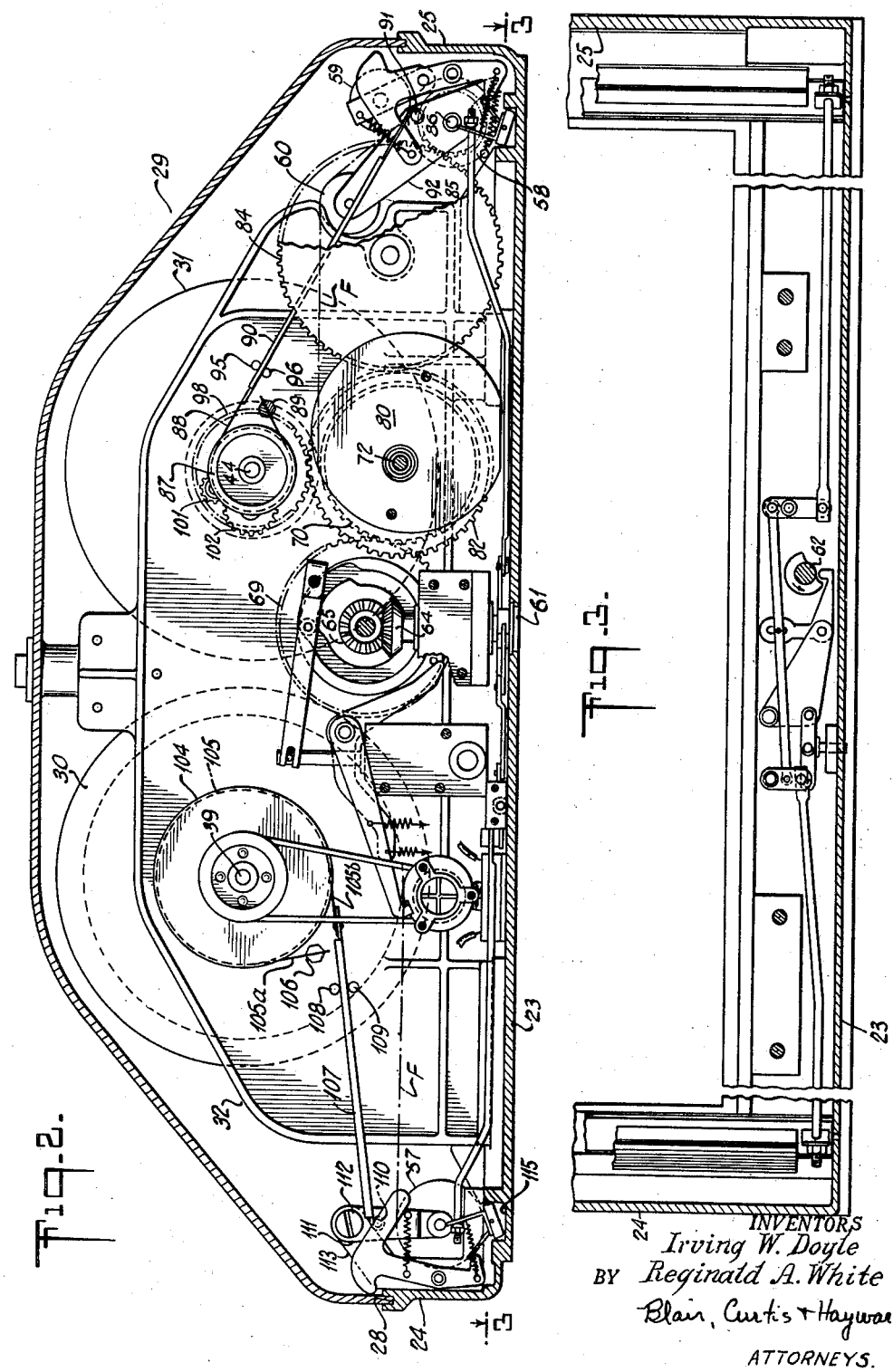

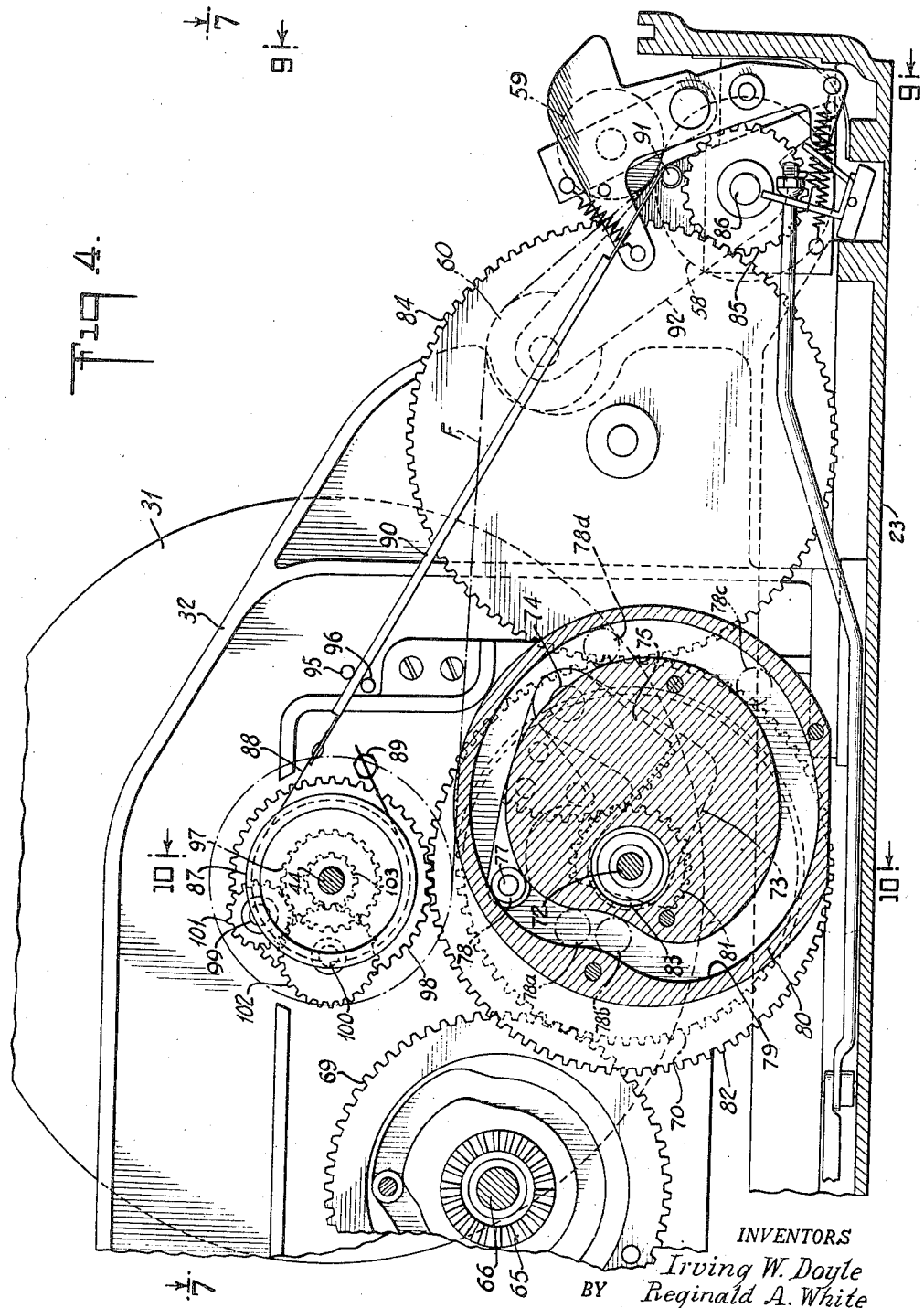

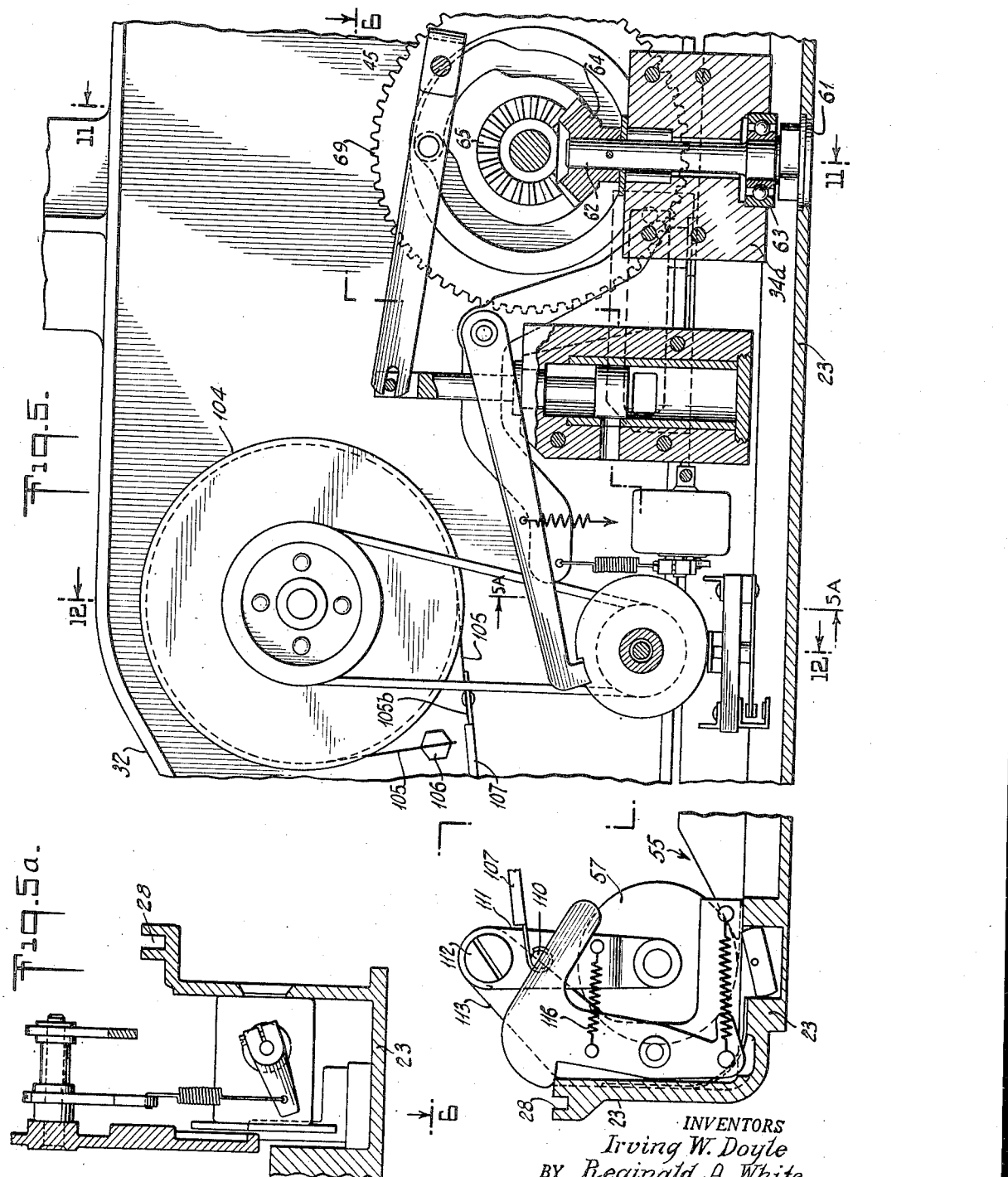

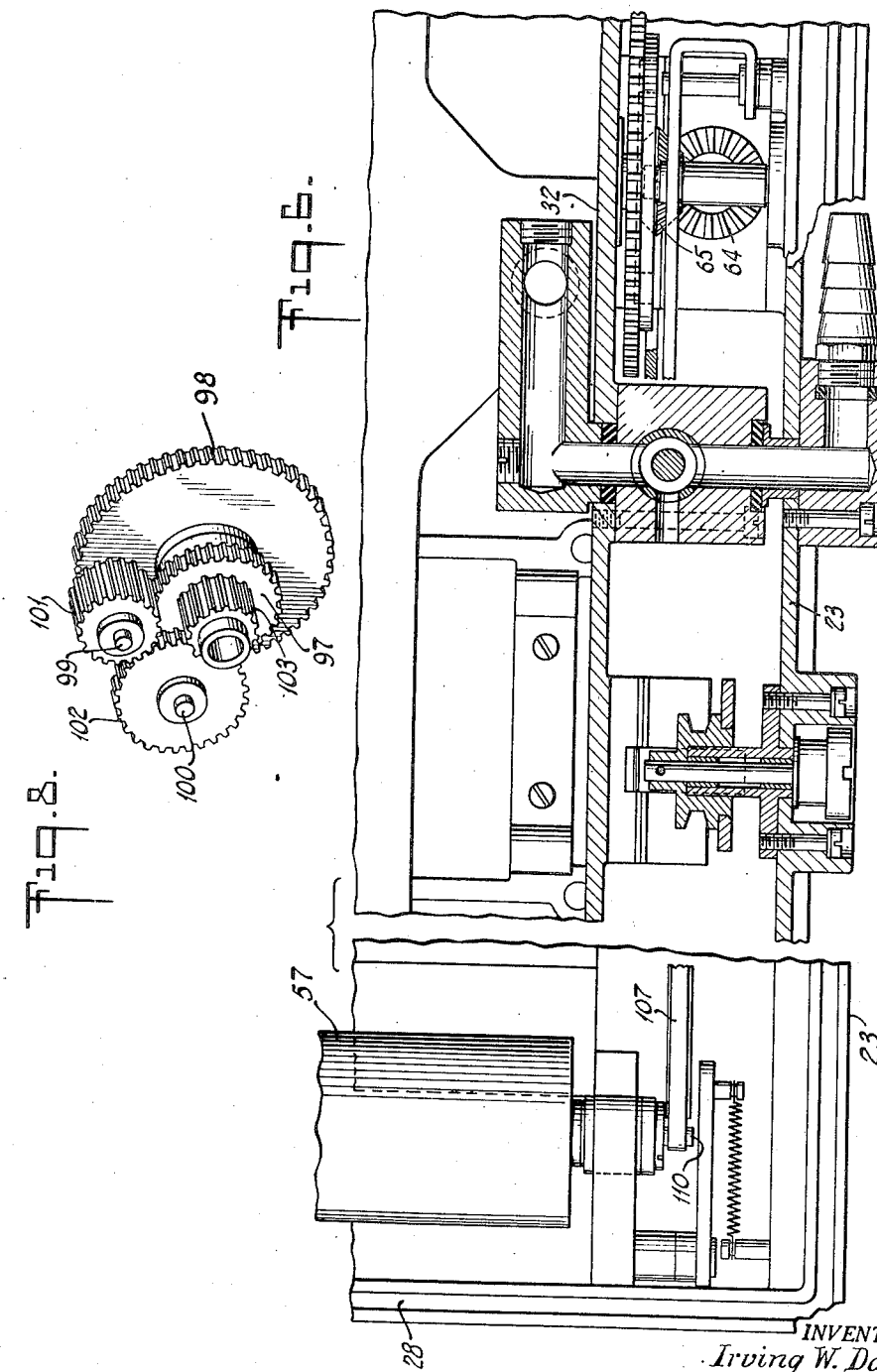

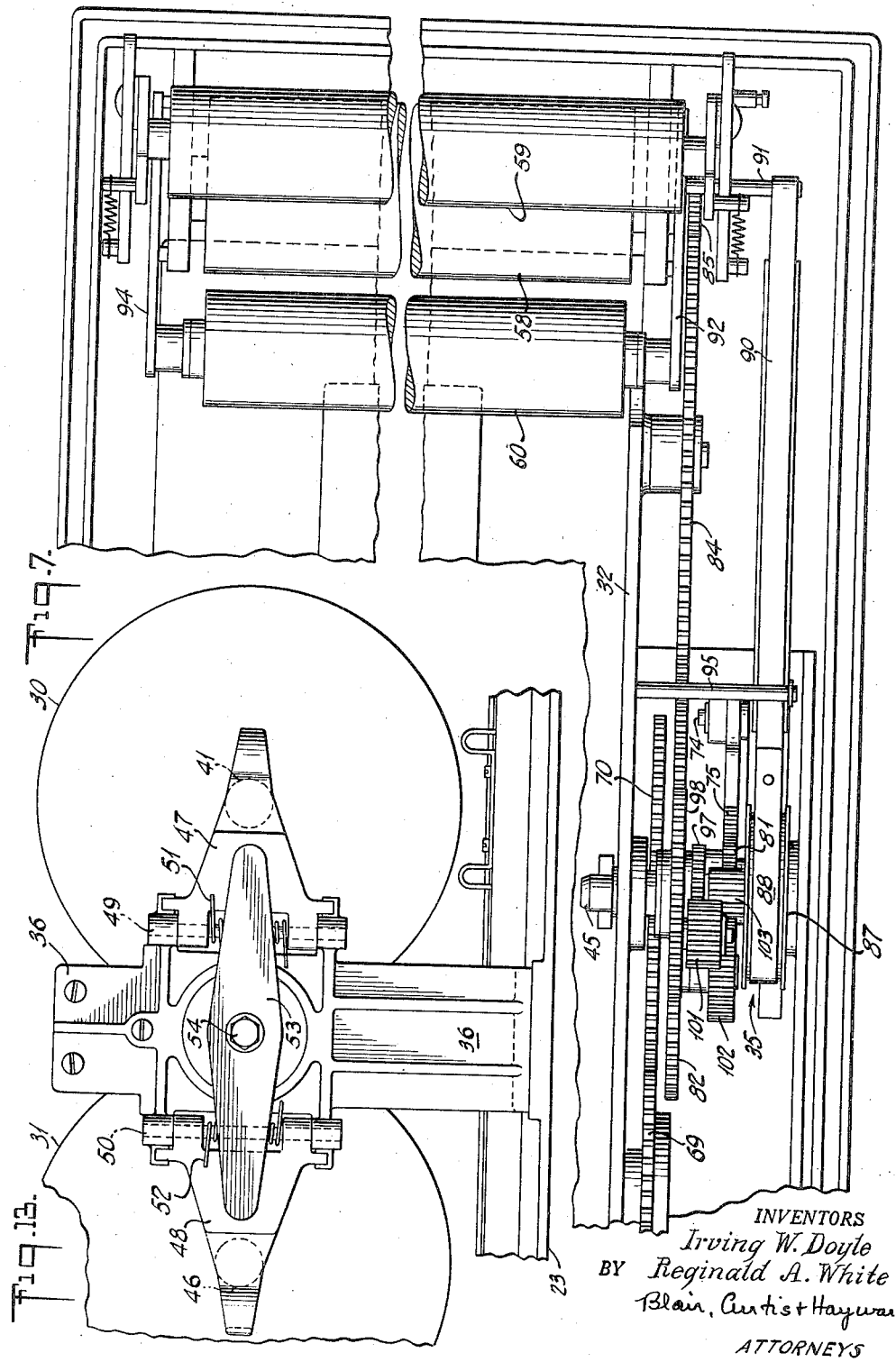

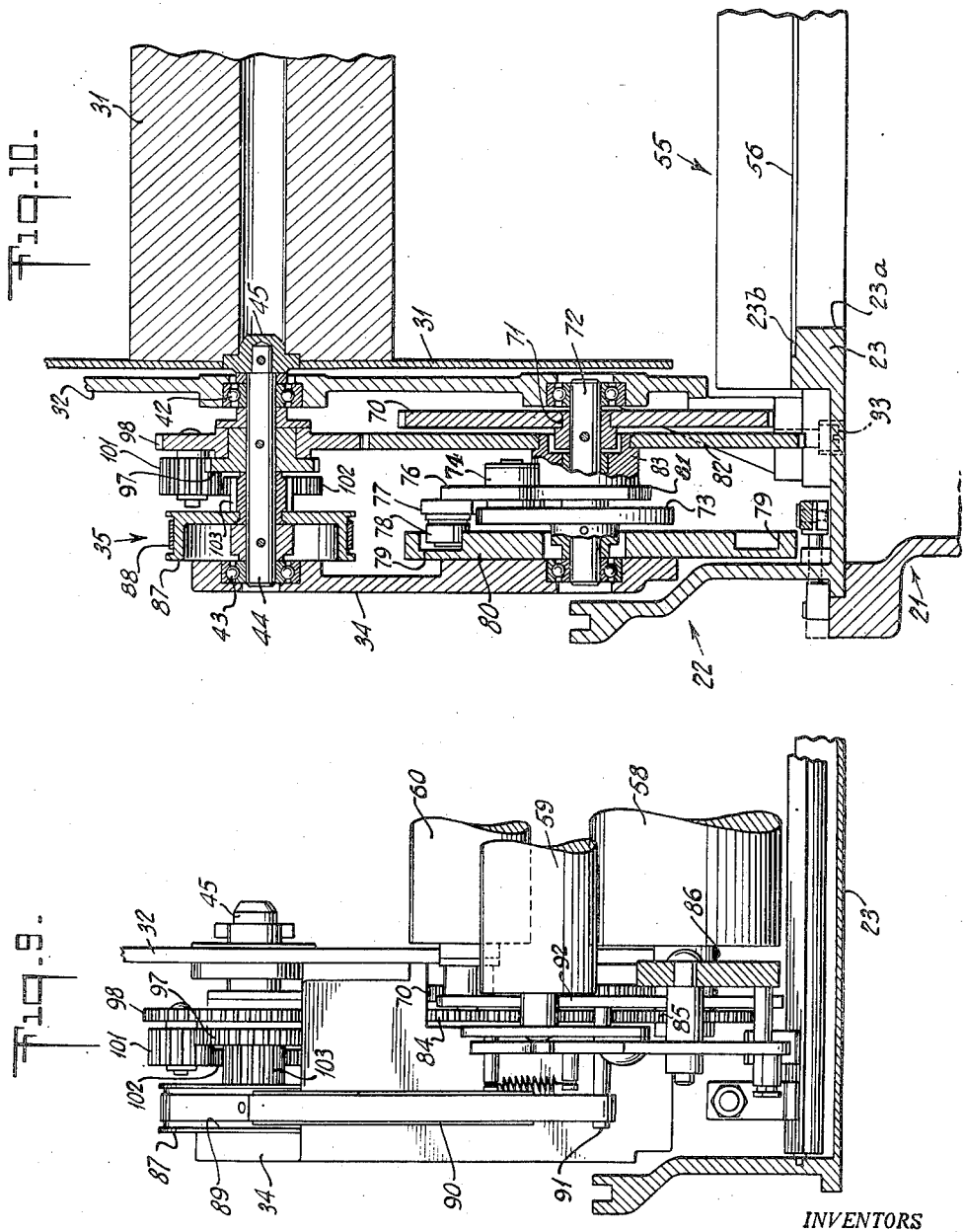

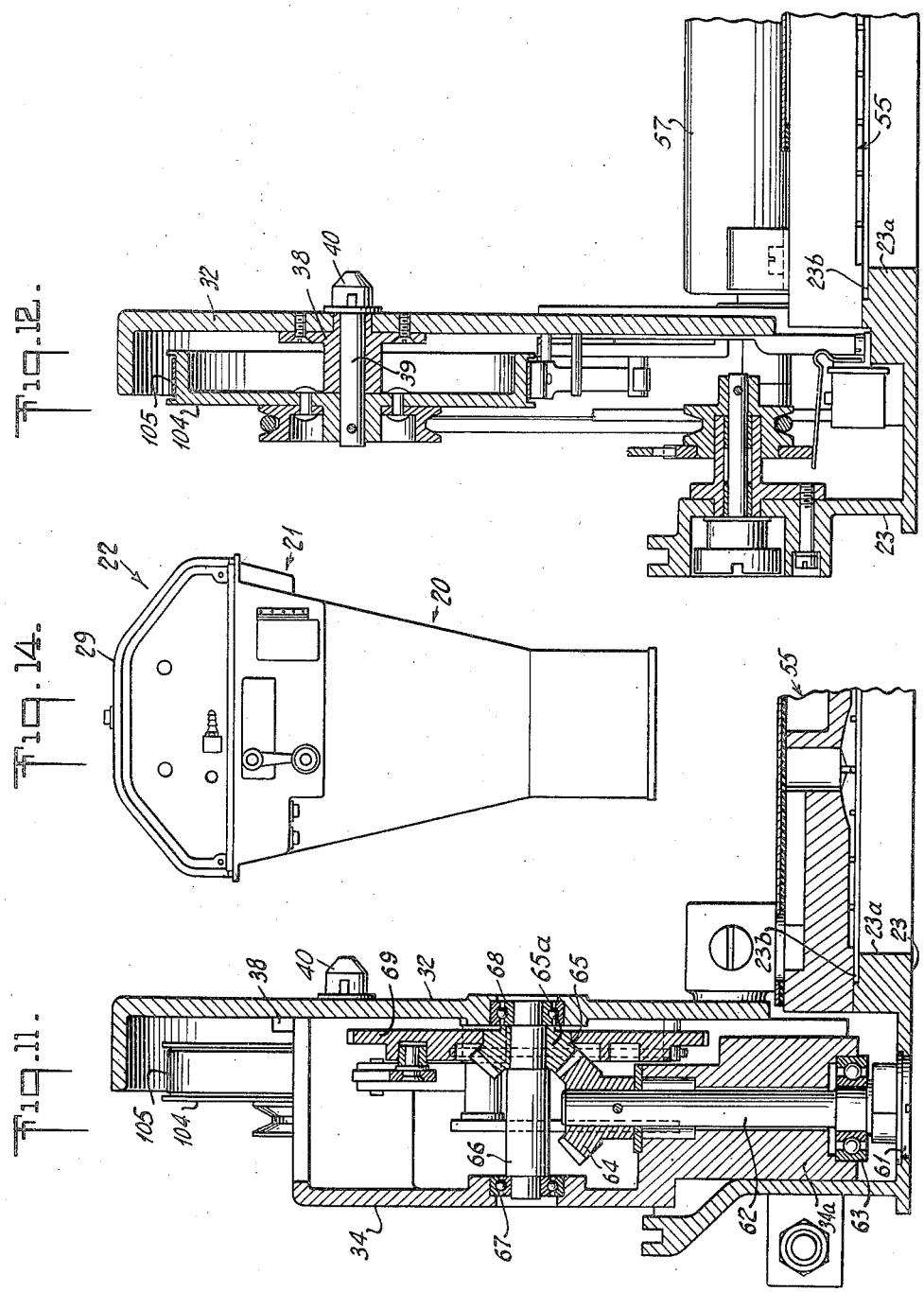

2,495,161

UNITED STATES PATENT OFFICE 2,495,161

FILM FEEDING AND WINDING APPARATUS

Irving W. Doyle, Massapequa, and Reginald A. White, Pleasantville, N. Y., assignors to Fairchild Camera and Instrument Corporation, Jamaica, N. Y., a corporation of Delaware Original application November 13, 1943, Serial No. 510,146, now Patent No. 2,403,587, dated July 9, 1946. Divided and this application November 2, 1944, Serial No. 561,555

12 Claims. (Cl. 242—71)

This invention relates to cameras, and more particularly to a magazine adapted to be detachably secured to an aerial camera.

Aerial camera magazines of the character here under consideration are designed to carry strip film which, in the case of a large camera capable of taking pictures 9″ x 18″, for example, has considerable weight. Cameras of this type are used for mapping and reconnaissance work, and most of the cameras in present use are war-time adaptations of conventional aerial mapping cameras. The exigencies of war-time applications of these cameras, however, demonstrated that the film capacity thereof was insufficient, one reason for which being that it is often necessary to mount the camera in an inaccessible position in the aircraft, thus making it difficult if not impossible to effect magazine interchange to renew the film supply during a mission.

It further became evident that available forms of magazines could not be overloaded thus to increase the film carrying capacity and still operate efficiently, by reason of difficulties arising through the substantially increased factors of inertia and momentum of the loaded film supply and take-up spools. Additional difficulties were encountered in accurately metering the film where an extremely large quantity thereof was loaded in the magazine because of the very substantial variation in the diameter of the roll of film on the spools during the taking of a large number of successive photographs.

Still further difficulties were encountered in properly supporting the heavily loaded supply and take-up spools, particularly during evasive action of the aircraft, during which the aircraft and accordingly the camera is subjected to violent stresses by reason of the evolutions of the aircraft.

It is accordingly among the objects of this invention to provide a large capacity magazine for an aerial camera which is extremely sturdy and durable in construction, efficient and dependable in operation, and capable of obviating the above-mentioned difficulties in addition to others in a practical and efficient manner.

This application is a division of the copending application of Irving W. Doyle and Reginald A. White for "Camera magazine," Serial No. 510,146, filed November 13, 1943, which issued on July 9, 1946, as Patent No. 2,403,587.

The invention accordingly consists in the features of construction, combinations of elements, and arrangements of parts, as will be exemplified in the structure to be hereinafter described, and the scope of the application of which will be indicated in the following claims.

In the drawing, wherein we have shown one form of our invention,

Figure 1 is a top plan view of the magazine with the cover thereof removed to illustrate various internal mechanisms;

Figure 2 is a sectional elevation taken along the line 2—2 of Figure 1;

Figure 3 is a fragmentary horizontal section taken along the line 3—3 of Figure 2;

Figure 4 is an enlarged fragmentary vertical section showing in greater detail the mechanism shown in the right-hand portion of Figure 2;

Figure 5 is an enlarged fragmentary vertical section showing in greater detail the mechanisms in the left-hand portion of Figure 2;

Figure 5A is a fragmentary section taken along the line 5A—5A of Figure 5;

Figure 6 is a fragmentary horizontal staggered section taken along the line 6—6 of Figure 5;

Figure 7 is an enlarged fragmentary horizontal section taken along the line 7—7 of Figure 4;

Figure 8 is a perspective view of a planetary-like gear system comprising a part of the film take-up spool clutch;

Figure 9 is a vertical section taken along the line 9—9 of Figure 4;

Figure 10 is a fragmentary vertical section taken along the line 10—10 of Figure 4;

Figure 11 is a fragmentary vertical section taken along the line 11—11 of Figure 5;

Figure 12 is a fragmentary vertical section taken along the line 12—12 of Figure 5;

Figure 13 is an enlarged fragmentary elevation of a portion of the film supply and take-up spool support as viewed along the line 13—13 in Figure 1; and, Figure 14 is a side elevation of an aerial camera including our film magazine.

Similar reference characters refer to similar parts throughout the various views of the drawing.

In Figure 14 we have shown an aerial camera which consists of a cone-shaped body 20 in which the lens and shutter is disposed, a body 21 in which is contained the camera driving motor and the main camera winding mechanism, and our roll film magazine, generally indicated at 22, which is adapted to be detachably mounted on the body. The camera is adapted to be mounted on aircraft often in a position wherein it is inaccessible during flight, and accordingly the camera is fully automatic and remotely controllable by the proper individual of the aircraft personnel. The following description, however, is directed solely to magazine 22.

As shown in Figure 2, magazine 22 includes a base casting 23 having four upwardly extending sides 24, 25, 26 (Figure 1) and 27, the upper edges of which are provided with a continuous groove or slot 28 in which is received the edge of a cover 29 which is detachably secured on the magazine to cover the operating mechanisms therewithin. Thus base 23, the walls extending therefrom, and cover 29, form an enclosure in which are disposed a film supply spool 30, a film take-up spool 31 and various operating mechanisms therefor which will be described in detail below.

Disposed within the above-described enclosure is an upstanding bracket or support 32 (Figure 10) which is fastened to base 23 by suitable screws 33 and which, as shown in Figure 2, forms a partition which lies between the film spools 30 and 31 and the operating mechanism therefor. Secured to partition 32 in any suitable manner is a casting 34 (Figure 10) which, with the partition, comprises a unitary sub-assembly generally indicated at 35, constituting practically the entire operating mechanism. Thus it may be seen that this sub-assembly 35 is fastened to the base 23 of the magazine by screws 33 so as readily to be installable or removable with respect thereto as a unit. At that side of the base casting 23 opposite from the assembly 35 is an upright casting 36 (Figure 1) which is fastened to the base casting 32 in any suitable manner. Casting 36 is tied to partition 32 by a tie plate 37 fastened at its opposite ends to the partition and casting by suitable screws. Thus the assembly is sufficiently rigid to withstand the substantial stresses to which the camera is subjected during use.

As shown in Figure 12, casting 32 has secured to the left-hand side thereof a bearing element 38 which rotatably receives a spindle 39 on the right-hand end of which is fastened a pivot 40 adapted to enter into one end of the film supply spool 30 (Figure 2). The other end of the film supply spool is received on a pivot 41 (Figure 1) which is movable between its solid and dotted line positions, as will be described in greater detail hereinafter.

*Film spool mounts (Figures 1 and 13)*

As shown in Figure 10, partition 32 also has mounted therein a small ball bearing 42 which is coaxial with a similar bearing 43 mounted in casting 34 and these two bearings rotatably mount a spindle 44 to the inner end of which is fastened a pivot 45 adapted to receive one end of the film take-up spool 31. The other end of the take-up spool 31 is mounted on a pivot 46 (Figure 1), which is movable toward and away from the take-up spool in the same manner as supply spool pivot 41. Thus pivots 41 and 46 are respectively mounted on arms 47 and 48 which are hinged to casting 36 by means of pins 49 and 50. This hinged connection permits the arms 47 and 48 to be swung toward and away from their respective film spools to permit insertion and removal of the spools from the magazine.

As is better shown in Figure 13, springs 51 and 52 are respectively associated with pins 49 and 50 and bear respectively against arms 47 and 48 to bias these arms into their spool engaging position, as shown in solid lines in Figure 1. Preferably we provide a bar 53, pivoted as at 54 to upright casting 36, and adapted to be swung to the position shown so that its ends lie in back of arms 47 and 48, thus to prevent swinging of the arms against the bias of their springs from their spool engaging position. Hence the spools are prevented from becoming dislodged accidentally during operation of the camera. When it is desired to remove the spools from the magazine, bar 53 may be rotated 90°, whereupon arms 47 and 48 may be pivoted about their respective pins, thus permitting removal of the film supply and take-up spools. Preferably there is a spring (not shown) associated with bar 53 and its pivot, which biases the bar to its horizontal position shown in Figure 13, so as to preclude any possibility of the bar remaining in its unlocked position after the film spools are in place. Although springs 51 and 52 press arms 47 and 48 together with their spool pivots 41 and 46 into spool engaging position, these springs are not sufficiently strong to support the full weight of the loaded spools in the event that the magazine should become tilted during operation. Thus it will appear that bar 53 locks the spool pivot supporting arms in proper operative position, assuring maintenance of the film spools in their proper positions during operation of the camera.

*Film feeding mechanism (Figures 2, 4, 9, 10, 11)*

Fastened to magazine base 23 (Figure 10) is a focal plane casting, generally indicated at 55, which is secured to the magazine base in any suitable manner over an aperture 23a in the base. The edges of base 23 on opposite sides of aperture 23a are slightly recessed to form opposed grooves, such as groove 23b, between the focal plane casting 55 and base 23 for the passage of film. Thus when the film is loaded in the magazine, the leading end thereof is drawn from the film supply spool 30 (Figure 2), is passed over a guide roller 57 (Figures 2 and 5) between focal plane casting 55 (Figure 10) and base casting 23, around a drive roller 58, beneath a pressure roller 59 (Figure 4), over a tension roller 60, and thence onto the take-up spool 31 where it may be secured in any suitable manner as, for example, by a piece of tape. Thus, as will now be described, the film is drawn from the supply spool in accurate amounts through the operation of the mechanism in assembly 35 (Figure 10) which drives the feed roller 58 (Figure 7) and also the take-up spool 31 (Figure 10).

The entire film magazine mechanism is operated from the camera winding mechanism in body 21 (Figure 14) by means of a slotted coupling 61 (Figures 2 and 11), the bottom surface of which is flush with the bottom of base 23. Coupling 61 (Figure 11) is fastened to the lower end of a shaft 62 journaled by a ball bearing 63 mounted in the lower portion 34a of casting 34. To the upper end of shaft 62 is attached a bevel gear 64 which meshes with a bevel gear 65 secured on one end of a stud shaft 66 journaled at its opposite ends in ball bearings 67 and 68 mounted respectively in casting 34 and bracket 32. Bevel gear 65 includes a hub portion 65a on which is fastened a large spur gear 69 (see Figure 2) which meshes with a gear 70 which, as shown in Figure 10, is secured to a hub 71 pinned to a shaft 72, the opposite ends of which are mounted in ball bearings secured respectively in casting 34 and bracket 32.

Also pinned to shaft 72 is an arm 73 (Figure 4) which carries a stud 74 on which is mounted a gear sector 75. Gear sector 75 (Figure 10) includes an arm 76 to which is fastened a stud 77 rotatably carrying a roller or cam follower 78. Follower 78 extends into a groove 79 formed in a fixed cam 80 which may be fastened in any suitable manner to casting 34. Thus, as shaft 72 rotates, arm 73 and accordingly gear sector 75 rotate with it to drive the roller or follower 78 around in the cam groove 79.

Loosely mounted on shaft 72 is an assembly comprising a gear 81 and a gear 82 which, as shown in Figure 10, are fastened to a hub 83 and accordingly rotate together. Gear sector 75 (Figure 4) meshes with gear 81, while gear 82 meshes with a large gear 84 which in turn meshes with a smaller gear 85 fastened to the spindle 86 on one end of which the film feed drive roller 58 is carried. It will now appear that upon operation of the mechanism in body 21 (Figures 11, 14) disc 61 and accordingly shaft 62 and bevels 64 and 65 (Figure 11) are driven, causing rotation of gears 69 and 70. Thus gear 70, in turn, drives shaft 72, and as the shaft rotates, arm 73 carries gear sector 75 and cam follower 78 with it. This gear train is so proportioned that the arm 73 makes one rotation per cycle. As this arm rotates, gears 81 and 82 are given a motion consisting of the resultant of the motion of arm 73 about shaft 72 and the motion of sector 75 with respect to arm 73.

The position of these parts, as shown in Figure 4, corresponds to their position at the beginning or at the end of the cycle. In this position, as arm 73 rotates counterclockwise, roller 78 is forced toward the center of shaft 72 by groove 79 so that the motion of gear sector 75 with respect to arm 73 exactly cancels the motion of the arm. Therefore, gear 82 remains stationary during this initial movement. When arm 73 has rotated sufficiently for roller 78 to reach, for example, the position 78a, the path of the roller is changed so that the motion imparted to gear 82 by means of gear sector 75 operating through gear 81 will be added to the motion imparted to gear 82 due to the rotation of arm 73. If gear sector 75 were restrained from moving with respect to arm 73, the sector teeth would impart a motion to gear 82 exactly the same as the motion of arm 73. In other words, if roller 78 does not move closer to or farther from the center of shaft 72, the entire arm assembly will move as a unit, carrying gear 82 with it. If roller 78 is permitted to move closer to the center of shaft 72, it decreases the motion imparted to gear 82. If roller 78 moves away from the center of shaft 72, as arm 73 rotates the motion imparted to gear 82 is increased. Thus, as noted above, during the first few degrees of motion at the beginning of the cycle, roller 78 moves closer to the center of shaft 72 and at such a rate, by reason of the contour of groove 79, that gear 82 is not moved at all. Following this initial movement, the motion of the roller transversely of shaft 72 is controlled so as to accelerate gear 82 gradually until roller 78 reaches a position indicated approximately at 78b. From this position until the roller reaches the position indicated at 78c, the roller is forced outward from the center of shaft 72 at a constant velocity, and the relative motion of gear sector 75 with respect to arm 73, added to the motion of the arm itself, imparts a constant velocity to gear 82. From the position 78c to the position 78d of the roller, the roller is controlled in such a way as to effect the gradual deceleration of gear 82. From position 78d to its solid line position, roller 78 is moved closer and closer to the center of shaft 72, and at a constant rate designed to cancel exactly the rotated motions and leave gear 82 at rest. The solid line position of roller 78 represents the end of the cycle, as well as the beginning thereof.

Thus it will be seen that gear 82 throughout its operative cycle of one revolution is first slowly accelerated from a rest position, then driven at a constant velocity, and then decelerated until its motion ceases. A similar motion is accordingly imparted to gear 84, and by this gear, to the film feed roller 58, through gear 85. It might be noted that the feed roller 58, as well as pressure roller 59, are both covered with rubber or similar material in order to increase the coefficient of friction thereof, and thus hold the film slippage to a minimum to assure high accuracy of film metering during the cycle.

During the entire operative cycle of the magazine in which arm 73 makes one complete counterclockwise revolution, coming to rest at the same position it occupied at the beginning of the cycle, it is obvious that gear 82 will also be given one complete turn counterclockwise. The motion of gear 82, however, does not start at the beginning of the cycle, and furthermore its motion is finished before the end of the cycle.

The gear ratio between gears 72, 84 and 85 is calculated to rotate the feed roller 58 sufficiently that its periphery will move the required amount of film during the cycle, and accordingly draw the appropriate amount from the supply spool 30 (Figure 2) through the magazine. This film must, of course, be wound on the take-up spool 31, and we have provided a mechanism to accomplish this which will now be described.

*Film take-up mechanism*

As shown in Figure 10, sub-assembly 35 includes a drum 87 loosely mounted on shaft 44, which, as pointed out above, carries pivot 45 at its inner end. The pivot supports the film take-up spool 31. Wrapped partially around drum 87 is a thin metallic strip or brake band 88 (Figure 4) one end of which is fastened as at 89 to casting 34. The other end of this brake band is secured to a rigid channel-shaped bar 90, the lower end of which is attached to a post 91 fixed to an arm 92, which arm is pivotally mounted on spindle 86 (Figures 2 and 9). Arm 92 (Figure 7) has its counterpart in an arm 94 at the opposite end of roller 60, and the free ends of these pivoted arms rotatably support the film tension roller 60 which, as shown in Figure 2, underlies the film strip F, as the film is wound on take-up spool 31. Suitable spring means (not shown) are provided for biasing the arms 92 and 94, and accordingly the tension roller 60, clockwise, as viewed in Figure 2, thus to tension the film between the feed roller 58 and the take-up spool 31.

The upper end of the brake band bar 90 is slidably disposed between a pair of fixed pins 95 and 96, and as arm 92 pivots counterclockwise under the tension of the film, pin 91 moves toward the take-up spool 31, thus permitting bar 90 to move to the left, which loosens the engagement between strip 88 and drum 87. The loosening of the engagement between strip 88 and drum 87 occurs when the slack in the film strip F has been substantially taken up. When there is too much slack in the film strip, then the spring bias on arms 92 and 94 pivots these arms clockwise, as viewed in Figure 2, which moves pin 91 away from the take-up spool 31 and accordingly tightens strip 88 about drum 87. As will be pointed out below, the loosening of the strip on the drum stops the feeding movement of the drum, whereas the tightening of the strip 88 on drum 87 causes the film take-up spool to be driven and hence to wind film thereon.

Referring to Figure 10, spindle 44 has pinned thereto a gear 97, the hub of which rotatably supports a gear 98 which meshes with gear 82 (see also Figure 4). Attached to gear 98 (Figures 8 and 10) are two studs 99 and 100, which rotatably carry meshing gears 101 and 102, respectively. Gear 101 also meshes with gear 97 while gear 102 meshes with a gear 103 which, as shown in Figure 10, is loosely mounted on spindle 44 and is attached to drum 87. Accordingly, it may be seen that as long as the brake band 88 is tight enough to hold drum 87 stationary, gear 103 is also held stationary. Since gear 82 (Figure 4) is rotated counterclockwise during the winding portion of the operative cycle, gear 98 is rotated clockwise. Hence, since gear 103 (Figure 4) is held stationary by drum 87, clockwise rotation will be given to gear 102 as its center is carried around the center of shaft 44 by reason of the rotation of gear 98. This causes gear 101 to rotate counterclockwise about its center, thus to impart clockwise rotation to gear 97 which, as noted above, is pinned to shaft 44 (Figure 10). Thus shaft 44 is caused to rotate and spool pivot 45 accordingly rotates the take-up spool 31, thus winding up the slack film onto the spool.

When the film slack has been entirely taken up, further rotation of the take-up spool 31 results in a tension in the film which presses the tension roller 60 (Figure 2) downwardly, causing the engagement between brake band 88 and drum 87 to slacken, as described above, thus permitting the drum 87 to rotate, rather than remain stationary. Of course, if the gear which rotates shaft 44 is not driven, the take-up spool remains stationary. The amount of the spring bias on arms 92 and 94 (Figure 7) tends to prevent any more film from being wound on spool 31, and the spool either then slows down or stops. As it slows down, shaft 44 (Figure 10) likewise slows down, as well as gear 103. If gear 97 slows down sufficiently or stops, gear 101 will have to rotate clockwise (Figure 8) as its center, which is mounted on gear 98, is moved clockwise about the center of shaft 44 (Figure 4) due to the driving force provided by gear 82 which, of course, cannot be stopped during the operative cycle. This clockwise motion of gear 101 (Figure 8) results in counterclockwise rotation of gear 102 which, in turn results in clockwise rotation of gear 103 and accordingly drum 87 (Figure 10). However, since the brake band 88 is loose, the drum will revolve with no appreciable effort. Actually during the winding cycle, brake band 88 is neither tight nor completely loose. Hence drum 87 and gear 103 are permitted to slip somewhat so that shaft 44 is turned just enough to keep the slack out of the film by taking up this slack on spool 31 as fast as the film feed roller 58 (Figure 4) feeds film through the magazine. Also, the arms 92 and 94 (Figure 4) are held substantially in a position of equilibrium or balance in which the brake band 88 (Figure 4) is neither tight nor completely loose, as noted above. Thus the tension in the film is balanced by the force of the spring bias on arms 92 and 94. Inasmuch as this spring bias is relatively light, it results in a greater slipping of the clutch comprising brake band 88 and drum 87, so that the torque input to gear 98 is relatively light since it need be merely sufficient to maintain the above-mentioned tension in the film. Thus it will appear that the torque input to the film take-up spool driving mechanism is a function of the tension of the film between the film feed roller 58 and the take-up spool 31. It accordingly follows that the film take-up mechanism described comprises, in effect, a slipping clutch in which the transmitted torque may be controlled from an extremely low value to an extremely high value as load conditions change, by means of the slack in the film itself.

As noted hereinabove, trouble has been encountered in previous magazines of the character under consideration, particularly large magazines, whenever a large mass of film was used, and/or whenever the film had to be wound in an extremely short period of time. It is apparent that the gear ratio to the take-up spool 31 must be sufficiently high to wind the entire length of film required during the permitted portion of the operative cycle with the take-up spool empty. This portion of the cycle may be somewhere around 300° of the input winding shaft. Near the end of the mission when a large diameter of film has been wound on the take-up spool, the entire length of film may be taken up in as little as 95°, where a spool of the large capacity contemplated herein is used. Since the speed of the input shaft remains constant, the film winding speed under these conditions is extremely high, which means simply that a greater load is applied to the mechanism at the instant the film is started. This also means that when the required length of film has been wound there is substantial momentum generated which must be absorbed in order to stop the film feed and take-up spools at the right time. Thus it follows that where the film is fed by means of roller 58 (Figure 8) the film is always moved its required length throughout the same portion of the cycle, regardless of the diameter of film on either the supply or take-up spools. This, of course, results in much less strain on the various parts of the operating mechanism of the magazine, and also in considerably less load on the camera drive mechanism in case drive 21 (Figure 1). Furthermore, through the provision of the gradual acceleration of the film feed drive mechanism at the beginning of the operative cycle, and the gradual deceleration at the end of the cycle, the driving mechanisms are not strained and peak loads are obviated. Furthermore, this gradual acceleration and deceleration of the film greatly lends to the accuracy of the film metering, as it precludes any possibility of the film's slipping between the film feed roll 58 and the pressure roll 59 (Figure 7).

*Film supply spool brake*

Inasmuch as it is of great importance that a new expanse of film be fed into proper exposure position in a very short period of time, substantial momentum is generated in the film supply spool 30, particularly when it is full of film, and the spool would, if left free to rotate, coast at the end of the winding cycle and permit enough slack to form which might either cause the film to be scratched or to become jammed in the magazine, or both. We have, accordingly, provided a supply spool braking mechanism which will now be described.

The supply spool braking system is shown in Figures 1, 2, 5, 6 and 12. As shown in Figure 12, the film supply spool spindle 39 is rotatably mounted in bushing 38 and on the spindle is pinned the hub of a drum 104. Encircling drum 104 is a brake band 105, one end 105a of which is attached to a stud 106 (Figure 2) mounted on bracket 32, the other end 105b of the brake band being attached to a rigid channel-shaped member 107 similar to channel member 90. This channel slidably extends through and is guided by a pair of spaced pins 108 and 109, secured to and extending from bracket 32, the other end of channel 107 being attached to a pin 110 (Figure 5) fastened to an arm 111, the lower end of which rotatably supports one end of roller 57. The upper end of arm 111 is pivotally secured, as by a screw 112 to a small bracket 113 which is fastened to the base casting 23. The opposite end of roller 57 (Figure 1) is mounted on a similar arm 114 pivoted to a similar bracket 115. These arms 111 and 114 are given a clockwise bias, as viewed in Figure 5, by a pair of springs 116 and 116a, the opposite ends of which are attached respectively to the arms and the brackets 113 and 115.

As shown in Figure 2, the film F is fed from supply spool 30 over and under roller 57 and accordingly the springs 116 and 116a tend to take up the slack in the film as the springs pull roller 57 to the left, as viewed in this figure. As soon as the film feeding mechanism starts to draw the film to the right, as viewed in Figure 5, roller 57 is pulled to the right against the bias of springs 116 and 116a, and as this happens, brake band 105 is released, thus to free drum 104 so that the film supply spool 30 (Figure 2) may rotate freely. As the film F stops moving, roller 57 (Figure 5) is pulled to the left by reason of the bias of springs 116 and 116a, and this movement of the roller being transmitted to arm 111 draws brake band 105 tightly around drum 104, thus immediately applying a braking force through the band to the drum and thence to the film supply spool 30. Thus the braking force applied to the film supply spool is determined directly by the film itself, and no slack can form subsequent to the feed portion of the operative cycle. When it is necessary for the film supply spool to turn, the braking force on this spoon is almost completely removed, the force then immediately being applied to whatever extent is necessary to snub the spool quickly and permit any excessive slack from being created by the film spool coasting after the proper amount of film has been fed.

Accordingly it may be seen that we have provided a film winding mechanism which attains the several objects hereinabove set forth in a thoroughly practical and efficient manner.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

We claim:

1. In a film magazine for supporting and transporting large sized film to be exposed in an aerial camera, in combination, a film supply spool, a film take-up spool, a film metering roller against which the film is pressed to feed the film from the supply to the take-up spool during a cycle of winding operation, and means for driving said roller at a gradually accelerating rate then a gradually decelerating rate during the cycle of operation to feed film from the supply spool to the take-up spool first at an increasing linear velocity during the first part of the cycle to overcome the inertia of the film without impressing peak loads on the driving means and then at a varying linear velocity during the latter part of the cycle.

2. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, and means for driving said roller first at a gradually accelerating rate and finally at a gradually decelerating rate during the operative cycle to feed film from the supply to the take-up roll first at an increasing linear velocity during the first portion of the cycle, then at a constant linear velocity and finally at a decreasing linear velocity during the latter part of the cycle, whereby the inertia of the film and its supply spool at the first portion of the winding cycle is gradually overcome without imposing peak loads on the driving means.

3. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, gear means including a main constant speed driving gear and an idler gear for driving said roller, and means forming a variable speed driving connection between said gears for driving said idler gear and accordingly said roller at a varying rate during the cycle of operation.

4. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, gear means including a main constant speed driving gear and an idler gear for driving said roller, and cam and gear means forming a variable speed driving connection between said gears for driving said idler gear and accordingly said roller at a varying rate during the cycle of operation.

5. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, means including a main driving gear for driving said roller at a predetermined varying rate during the cycle of operation to feed film from the supply to the take-up spool first at a gradually accelerating velocity and thereafter at a gradually decelerating velocity, and means driven by said driving gear for driving said take-up spool during the cycle of operation to wind up film fed from said supply spool, a driving motor, and means forming a positive driving connection between said motor and said driving gear.

6. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, variable speed positive drive means for driving said roller at predetermined gradually accelerating and thereafter decelerating rates during the cycle of operation to feed film from the supply to the take-up spool at varying linear velocities, means connected to said driving means and driven thereby for driving said take-up spool during the cycle of operation to wind up film fed from said supply spool, and means for varying the rate of operation of said take-up spool driving means.

7. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, variable speed drive means for driving said roller at predetermined gradually accelerating and thereafter decelerating rates during the cycle of operation to feed film from the supply to the take-up spool at varying linear velocities, means connected to said driving means and driven thereby for driving said take-up spool during the cycle of operation to wind up film fed from said supply spool, and means controlled by the tension of the film between said roller and said take-up spool for varying the rate of operation of said take-up spool driving means.

8. In a film magazine for supporting and transporting large sized film to be exposed in an aerial camera, in combination, a film supply spool, a film take-up spool, means for feeding film from said supply spool to be wound on said take-up spool, means for driving said film feeding means, a rotatable film tension roller over which the film passes, means mounting said roller between said film feeding means and said take-up spool for movement toward and away from said take-up spool, a rotatable film tension roller over which the film passes from said supply spool to said film feeding means, means mounting said second-mentioned tension roller between said supply spool and said film feeding means in the path of film travel for movement toward and away from said supply spool, mechanism driven by said film feeding means for driving said take-up spool including means responsive to movement of said first tension roller to vary the rate of operation of said take-up spool, the movement of said first tension roller being toward and away from said take-up spool as the film tension between said take-up spool and said film feeding means varies, a brake for said supply spool, and means responsive to movement of said second-mentioned roller away from said supply spool for operating said brake to reduce the speed of said supply spool.

9. In a film magazine for supporting and transporting large sized film to be exposed in an aerial camera, in combination, a film supply spool, a film take-up spool, a film metering roller around which the film passes as it is fed from the supply to the take-up spool during a cycle of winding operation, means for driving said roller first at a gradually accelerating rate and thereafter at a gradually decelerating rate during the cycle of operation to feed film from the supply to the take-up spool at varying linear velocities, means driven by said roller driving means for driving said take-up spool during the operative cycle, means responsive to varying amounts of slack in the film between said metering roller and said take-up spool for varying the rate of operation of said take-up spool driving means, a brake for said supply spool, and means responsive to a lessening of tension in the film between said supply spool and said film metering roller for operating said brake to reduce the rate of rotation of said supply spool.

10. In a film magazine for supporting and transporting large sized film to be exposed in an aerial camera, in combination, a film supply spool, a film take-up spool, means for feeding film from said supply spool to be wound on said take-up spool, means including input and output gears for driving said first-mentioned means at a varying rate during the cycle of operation to feed film from the supply to the take-up spool at varying linear velocities, gear means connected to said output gear and to said take-up spool for driving said take-up spool during the cycle of operation to wind up film fed from said supply spool, and means for varying the rate of operation of said take-up spool driving means.

11. In camera construction, in combination, a film supply spool, a film take-up spool, means including a metering roller and a pressure roller for feeding film from said supply spool to be wound on said take-up spool, variable speed driving means operatively connected to said metering roller for driving said metering roller and accordingly feeding the film at predetermined rates of acceleration and deceleration throughout each operative cycle, means driven by said driving means and connected to said take-up spool for driving said take-up spool during the winding cycle, whereby said take-up spool is also driven at varying rates of acceleration and deceleration during the operative cycle, and means responsive to varying amounts of slack in the film between said feeding means and said take-up spool for varying the rate of operation of said take-up spool driving means.

12. In camera construction, in combination, a film supply spool, a film take-up spool, a film transporting device in the path of film travel between said spools for gripping the film and transporting it along a path between the supply spool and the take-up spool during a cycle of operation, and variable speed mechanism connected to said transporting device for driving said device first at a gradually accelerating rate and later at a gradually decelerating rate during the cycle of operation so that the film is transported first at an increasing linear velocity during the first part of the cycle to overcome the inertia of the film without impressing peak loads on said mechanism and then at a varying linear velocity during the latter part of the cycle.

IRVING W. DOYLE.
REGINALD A. WHITE.

REFERENCES CITED

The following references are of record in the file of this patent:

UNITED STATES PATENTS

| Number | Name | Date |
|---|---|---|
| 309,722 | Maertens | Dec. 23, 1884 |
| 1,628,939 | Wells | May 17, 1927 |
| 1,786,917 | Oehmichen | Dec. 30, 1930 |
| 2,027,818 | Golber | Jan. 14, 1936 |
| 2,107,074 | Hineline | Feb. 1, 1938 |
| 2,199,603 | Ackley | May 7, 1940 |

FOREIGN PATENTS

| Number | Country | Date |
|---|---|---|
| 16,897 | Great Britain | Aug. 2, 1904 |